US012470603B2

(12) United States Patent
Wei et al.

(10) Patent No.: US 12,470,603 B2
(45) Date of Patent: Nov. 11, 2025

(54) SYSTEMS AND METHODS FOR A HEURISTIC TREE OPTIMIZATION USING A PRIORITIZED DIMENSION SELECTION FOR POLICIES WITH MULTIPLE GIVEN DIMENSIONS

(71) Applicant: Fortinet, Inc., Sunnyvale, CA (US)

(72) Inventors: Tianrui Wei, Santa Clara, CA (US); Shushan Wen, Pleasant Hill, CA (US)

(73) Assignee: Fortinet, Inc., Sunnyvale, CA (US)

( * ) Notice: Subject to any disclaimer, the term of this patent is extended or adjusted under 35 U.S.C. 154(b) by 176 days.

(21) Appl. No.: 18/524,783

(22) Filed: Nov. 30, 2023

(65) Prior Publication Data

US 2025/0184359 A1   Jun. 5, 2025

(51) Int. Cl.
*H04L 9/40* (2022.01)
(52) U.S. Cl.
CPC ..................... *H04L 63/20* (2013.01)
(58) Field of Classification Search
CPC ....................................................... H04L 63/20
See application file for complete search history.

(56) References Cited

U.S. PATENT DOCUMENTS

| 2007/0216435 | A1* | 9/2007 | Iguchi | G01R 31/31924 324/762.01 |
| 2014/0282831 | A1* | 9/2014 | Pedroza | H04L 63/20 726/1 |
| 2022/0360461 | A1* | 11/2022 | Raleigh | H04W 28/0221 |
| 2023/0283590 | A1* | 9/2023 | Wen | H04L 63/0227 726/1 |

* cited by examiner

*Primary Examiner* — El Hadji M Sall
(74) *Attorney, Agent, or Firm* — Jaffery Watson Hamilton & DeSanctis LLP

(57) ABSTRACT

Various embodiments provide systems and methods for a heuristic policy search tree optimization using a prioritized dimension selection. A computer-implemented method for optimizing a policy search tree includes differentiating, with a network appliance, dimensions based on multiple priority levels of a priority dimension configurable setting, determining whether a first dimension having a first priority level for a node of the policy search tree satisfies configurable thresholds for characteristics of a policy set, and selecting the first dimension having the first priority level if no configurable threshold violation for the first dimension.

20 Claims, 9 Drawing Sheets

```
1   /* Settings (numbers are examples) */
2
3   /* Maximum dimension ID number.
4      Each dimension has a unique ID from 0 to MAX_DIM-1.
5   */
6   MAX_DIM = 8;
7
8   prio_dim_arr[] = {
9   /* Each line has the following variables:
10     bm (dimension bitmap),
11     th (threshold of policy range unique count on a dimension),
12    pol_wc_th (policy count threshold with wildcard on a dimension),
13    dp (depth limit)
14  */
15     {1<<VDOM         ,   1, 65535,  2},
16     {1<<SIF | 1<<TIF,    2, 50   ,  2},
17     {0               ,   0, 0    ,  0},
18  };
```

FIG. 5

```
1   /* Process dimension selection for given policy set */
2   prio_dim_selection(node)
3   {
4     dim_level = -1;
5     prio_dim_found = 0;
6     polset = node.polset; //Policy set under given node
7
8     while (1) { // each loop process a dim level
9       dim_level++;
10      cur_dim_ctrl = prio_dim_arr[dim_level];
11      cur_dim_bm = cur_dim_ctrl.bm;
12      if (cur_dim_bm == 0) //end of prio_dim_arr
13        break;
14      cur_dim_th = cur_dim_ctrl.th;
15      cur_dim_wc_th = cur_dim_ctrl.pol_wc_th;
16      cur_dim_dp = cur_dim_ctrl.dp;
17      uniq_max_cnt = 0;
18
19      for (cur_dim = 0; cur_dim < MAX_DIM; ++cur_dim) {
20        if ( ((cur_dim<<1) & cur_dim_bm) == 1) { //Current dim enabled
21          /*Check if current dim can be skipped*/
22          if (node.bm_inherit & (1<<cur_dim))
23            continue;
24          cur_dim_uniq_cnt = polset.uniq_cnt[cur_dim];
25          /*Meet th and dp condition*/
26          if (cur_dim_uniq_cnt > cur_dim_th &&
27              cur_wc_pol_cnt < cur_dim_wc_th &&
28              node.cur_dp_inherit < cur_dim_dp) {
29            prio_dim_found = 1;
30            if (cur_dim_uniq_cnt > uniq_max_cnt) {
31              dim = cur_dim; //select dim
32              uniq_max_cnt = cur_dim_uniq_cnt;
33            }
34          } else {
35            node.bm_inherit |= (1<<cur_dim);
36            node.cur_dp_inherit = 0; //Get ready for next dim
37          }
38        }
39      }
40      if (prio_dim_found == 1) {
41        node.cur_dp_inherit++;
42        break; // exit while loop
43      }
44    } // end of while loop
45
46    if (prio_dim_found == 0) {
47      /*Traverse other dims and choose the one with maximum uniq_range_cnt*/
48      dim = traverse_dim(polset.uniq_cnt);
49    }
50    return dim;
51  }
```

FIG. 6

SYSTEMS AND METHODS FOR A HEURISTIC TREE OPTIMIZATION USING A PRIORITIZED DIMENSION SELECTION FOR POLICIES WITH MULTIPLE GIVEN DIMENSIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2023, Fortinet, Inc.

FIELD

Embodiments discussed generally relate to systems and methods for identifying security policies applicable to received information packets based upon a prioritized dimension selection using a heuristic policy search tree optimization.

BACKGROUND

Packet classification is a technical challenge in network gateway and firewall design. An enterprise-class networking device that supports policy searching uses the capability of classifying packets and mapping the classification results to corresponding policies. In enterprise-level network security settings, different policy sets can have a great variety of range count and range width on given dimensions. In some cases, different policies may show range diversity in different dimensions including a specific single value (i.e., both range count and range width are one), a wildcard (i.e., range count is one but range width is the full range), or a set of many range widths with a large range count. In the process of forming the policy search tree, an important part of each layer is to find the most suitable dimension for the subsequent cutting process. A common method of selecting a dimension is to traverse all dimensions in a fixed order, and then select the dimension which has the maximum unique range count. However, this method may create a large policy search tree, which is not ideal for tree creation nor search performance.

SUMMARY

Various embodiments provide systems and methods for a heuristic policy search tree optimization using A prioritized dimension selection. A computer-implemented method for optimizing a security policy search tree determines security policies for incoming packets of a network appliance. The method includes differentiating, with the network appliance, dimensions based on multiple priority levels of a priority dimension configurable setting, determining whether a first dimension having a first priority level for a node of the security policy search tree satisfies configurable thresholds for characteristics of a policy set having the security policies, and selecting the first dimension having the first priority level if no configurable threshold violation for the first dimension.

In some embodiments, a system includes a processing resource and a non-transitory computer readable medium coupled to the processing resource and having stored therein instructions that when executed by the processing resource cause the processing resource to: differentiate dimensions for a node of a policy search tree based on multiple priority levels of a priority dimension configurable setting; determine whether a first dimension having a first priority level for the node of the policy search tree satisfies configurable thresholds for characteristics of a policy set having security policies; and select the first dimension having the first priority level if no configurable threshold violation for the first dimension.

In some embodiments, a non-transitory computer readable medium having stored therein instructions that when executed by the processing resource cause the processing resource to: differentiate dimensions for a node of a policy search tree based on multiple priority levels of a priority dimension configurable setting; determine whether a first dimension having a first priority level for the node of the policy search tree satisfies configurable thresholds for characteristics of a policy set having security policies; and select the first dimension having the first priority level if no configurable threshold violation for the first dimension.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIG. 5 illustrates settings of prioritized dimension selection in accordance with various embodiments;

FIG. 6 illustrates settings of prioritized dimension selection for a given policy set in accordance with various embodiments;

DETAILED DESCRIPTION

Various embodiments provide systems and methods for a heuristic policy search tree optimization using prioritized dimension selection. A computer-implemented method for optimizing a security policy search tree determines security policies for incoming packets of a network appliance. The computer-implemented method includes differentiating, with the network appliance, dimensions based on multiple priority levels of a priority dimension configurable setting, determining whether a first dimension having a first priority level for a node of the security policy search tree satisfies configurable thresholds for characteristics of a policy set having the security policies, and selecting the first dimension having the first priority level if no configurable threshold violation for the first dimension.

Figure 2:
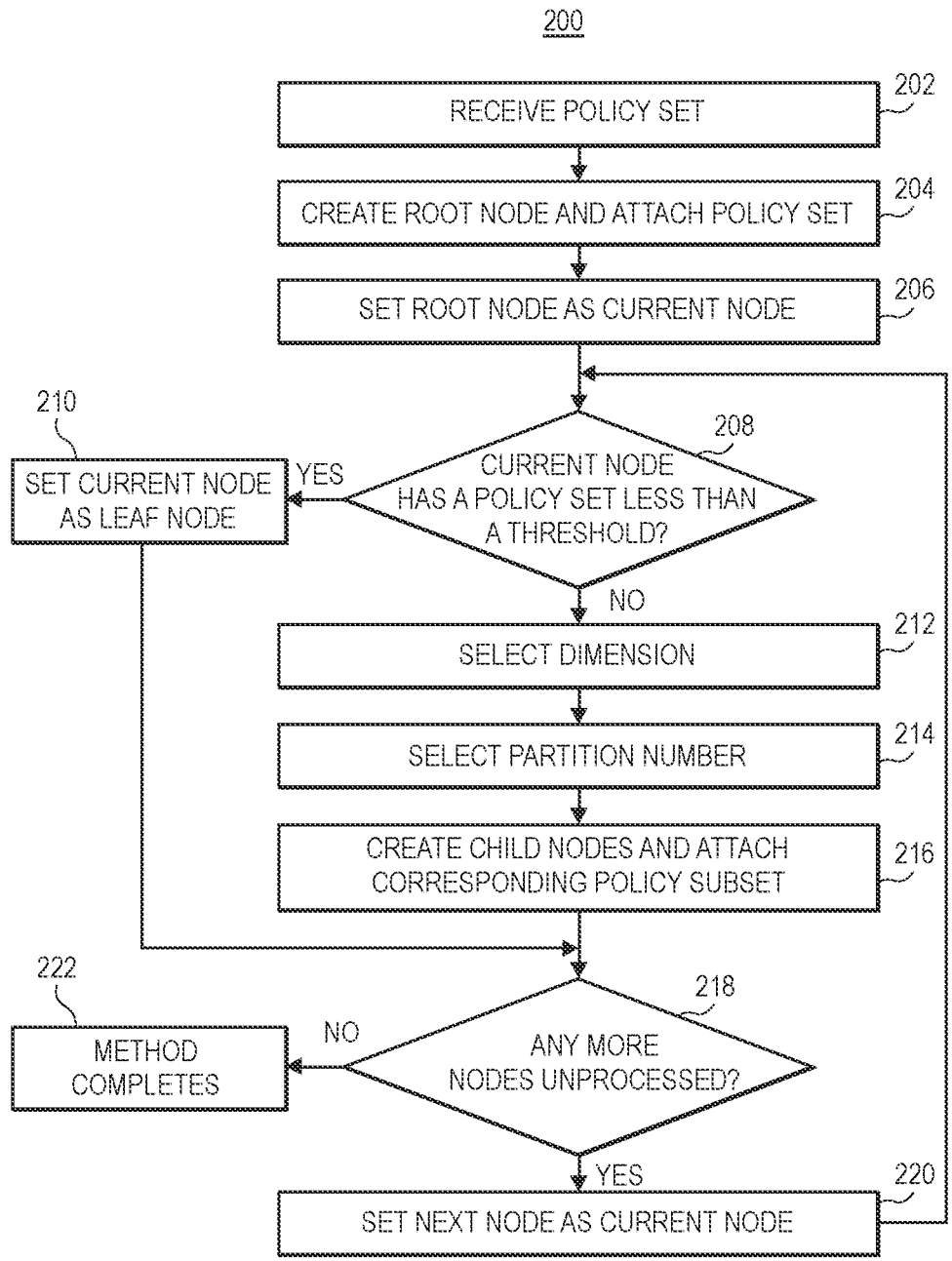
FIG. 2 is a flow diagram showing a method for building a policy search tree for security policy search in accordance with various embodiments.
Figure 3:
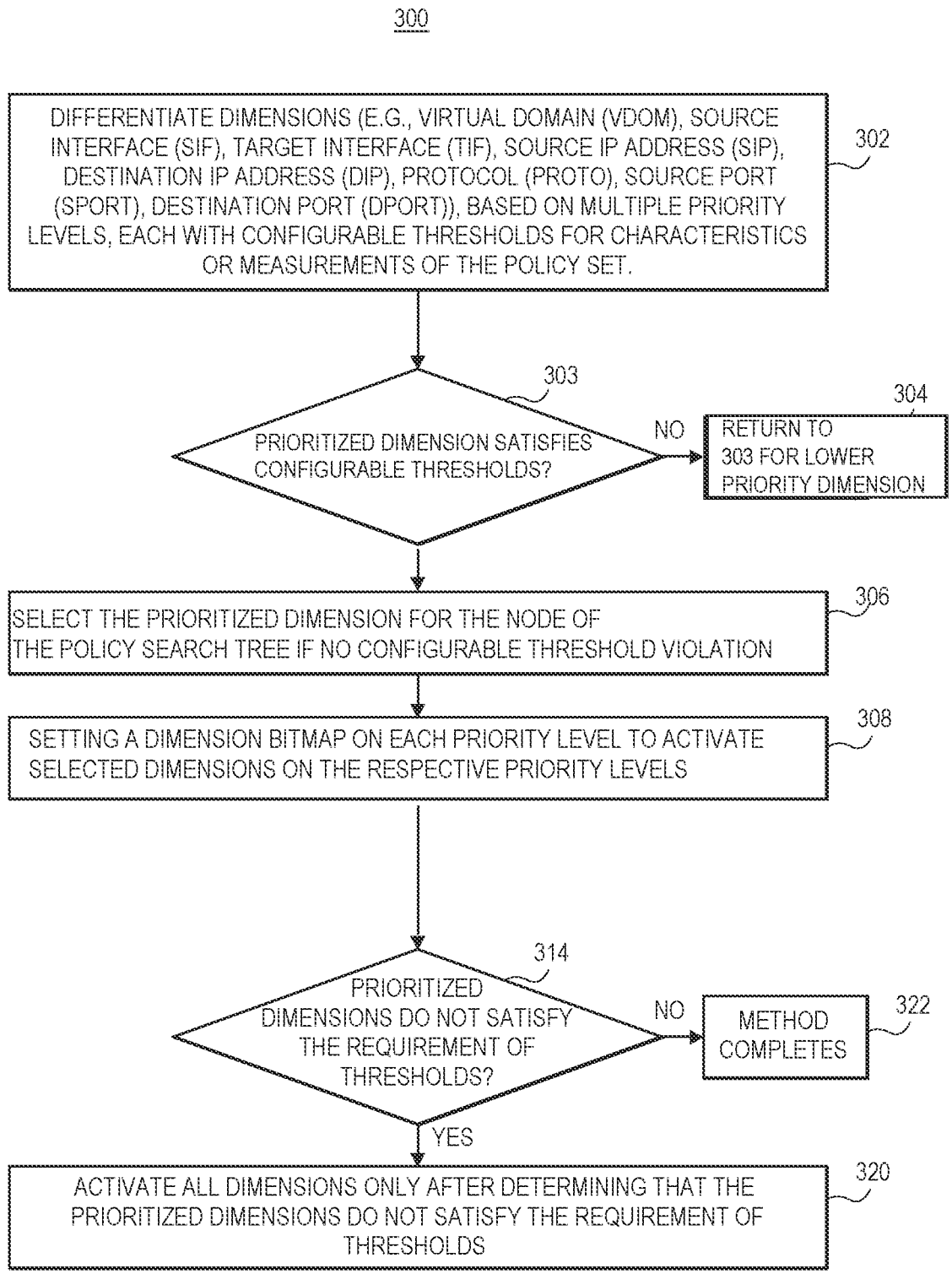
FIG. 3 illustrates a method of prioritized dimension selection for a policy search tree in accordance with some embodiments for improving performance of a security policy search.

In the process of forming the policy search tree, an important part of each layer is to find a most suitable dimension for the subsequent cutting process (e.g., block 212 in FIG. 2, block 306 in FIG. 3). A common method of selecting a dimension is to traverse all dimensions in a fixed order, and then select the dimension that has the maximum unique range count. However, this method may create a large policy search tree, which is not ideal for tree creation as well as search performance, when policies have various ranges/values in dimensions. The challenges and disadvantages of the common method of selecting a dimension are listed below.

a. Dimensions like IP address can have more unique ranges, each with different width and rarely shared by many of the policies, than other dimensions such as virtual domain, which usually has only a few single values, each shared by a group of policies.

b. The existing common method traverses all dimensions in each node when the tree is being built. This process will take a longer time when a policy set becomes huge.

c. Different policy sets have various characteristics. Choosing a dimension by a fixed counting method is not optimal for all scenarios.

The present design of prioritized dimension selection achieves improved search performance by adopting a hardware-friendly implementation while keeping tree node count and tree depth relatively low, and optimizing the dimension selection time in each node during tree creation.

The following technical challenges are evaluated during the present design. First, setting appropriate priority dimension orders according to a characteristic of a policy set is crucial to building the policy search tree. A well-designed priority dimension setting can greatly improve efficiency of policy search processes. On the contrary, a non-optimal setting may lead to more tree nodes and/or a deeper tree. Second, setting appropriate configurable variables, such as thresholds and parameters related to the control logic, is important to a policy search tree optimization. Every control variable is highly associated with the characteristic of a policy set. Third, the present design will fit all policies into a single policy search tree, or as few trees as possible if a condition allows. The more trees that need to be searched, the slower the performance will be.

The prioritized dimension selection of the present design can efficiently lower tree depth and reduce the number of tree nodes of a heuristic policy search tree compared to the common method of traversing all dimensions in a fixed order. The prioritized dimension selection improves performance by reducing a processing time for policy searches.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. Such network security devices may include, but are not limited to, network firewall devices and/or network gateway devices. While there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Figure 1A:
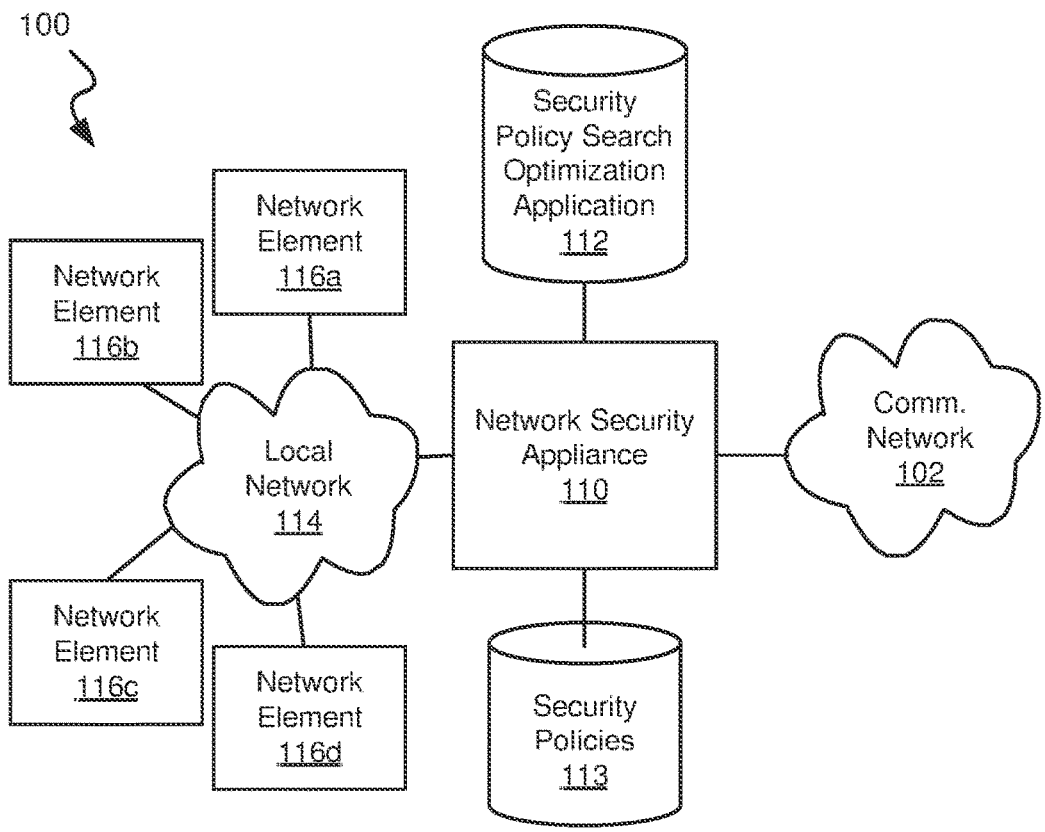
FIGS. 1A-1D illustrate a network architecture including a system (e.g., network security appliance) executing a security policy search optimization application in accordance with some embodiments.

Turning to FIG. 1A, network architecture 100 is shown in accordance with some embodiments. In the context of network architecture 100, a number of network elements (e.g., a network element 116a, a network element 116b, a network element 116c, and a network element 116d) are coupled to a local network 114. Local network 114 may be any type of communication network known in the art. Those skilled in the art will appreciate that local network 114 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. In some embodiments, network security appliance 110 includes hardware acceleration circuitry that can be dynamically configured to accelerate packet classification processes and/or identifying security policies for information packets received from a communication network 102. Communication network 102 may be any type of communication network known in the art. Those skilled in the art will appreciate that, each of communication network 102 can be wireless network, a wired network, or a combination thereof that can be implemented as one of the various types of networks, such as an Intranet, a Local Area Network (LAN), a Wide Area Network (WAN), an Internet, and the like. Further, communication network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network security appliance 110 is coupled to a computer readable storage medium (e.g., non-transitory computer readable storage medium) having stored thereon a security policy search optimization application 112. As more fully described below, security policy search optimization application 112 operates to segment and merge various security policies to optimize correlation between the various security policies and information packets received from communication network 102. In some embodiments, the optimization is formatted to program hardware acceleration circuitry included in network security appliance 110. Security policy search optimization application 112 includes instructions executable by a processor of network security appliance 110 to access a security policy database 113 that includes one or more security policies to be applied to communications passing through network security appliance 110. Based upon the disclosure provided herein, one of ordinary skill in the art will recognize a variety of security policies and sources of those security policies that may be used in relation to different embodiments.

Figure 1B:
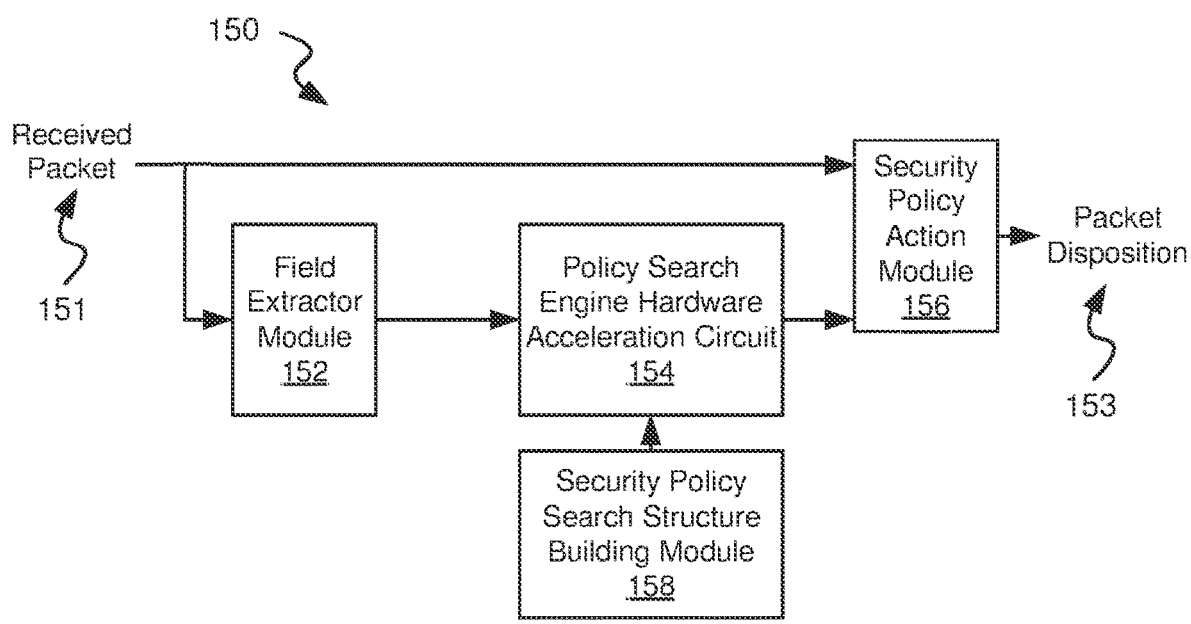

Turning to FIG. 1B, a block diagram of a security policy search and implementation engine 150 is illustrated in accordance with some embodiments. Security policy search and implementation engine 150 may be implemented as part of security appliance 110. As shown, security policy search and implementation engine 150 includes a field extractor module 152 that is configured to extract multiple fields from a received packet 151. Received packet 151 may be any packet of information known in the art. In some cases, received packet 151 is received from communication network 102, and in other cases received packet 151 is received one of network elements 116 via local network 114. The fields that are extracted from received packet 151 by field extractor module 152 may include, but are not limited to, Internet Protocol (IP) addresses for source and destination, protocol number, port numbers for source and destination, and other additional public or proprietary fields defined by the network systems. In some embodiments, field extractor module 152 is implemented as instructions executing on a general purpose processor. In other embodiments, field extractor module 152 is implemented on a dynamically configurable circuit.

The fields extracted by field extractor module 152 are provided to a policy search engine hardware acceleration circuit 154. Policy search engine hardware acceleration circuit 154 compares the received fields with a search tree of security policy rules that is optimized for hardware implementation. In some embodiments, the optimization relies upon a prioritized dimension selection based search tree created by a security policy search structure building module 158. Security policy search structure building module 158 generates a hardware image used to program the hardware of policy search engine hardware acceleration circuit 154. Policy search engine hardware acceleration circuit 154 identifies one or more security policies associated with the received fields, and provides an indication of the one or more security policies to a security policy action module 156.

In turn, security policy action module 156 applies the security policies indicated by policy search engine hardware acceleration circuit 154 to received packet 151. Application of the search policies results in a packet disposition 153 that may include one of: dropping received packet 151 so it is simply ignored, reporting received packet 151 to another entity for further investigation, or forwarding received packet 151 to a defined destination IP. Such forwarding may be done with or without some level of modification to one or more of the fields in received packet 151.

Figure 1C:
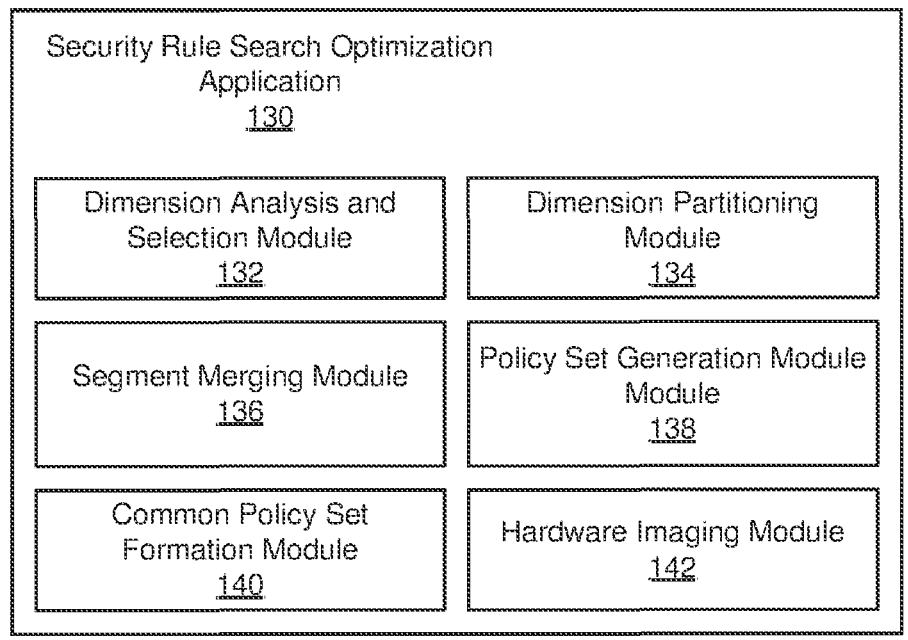

Turning to FIG. 1C, an example implementation of a security rule search optimization application 130 is shown in accordance with some embodiments. As shown in this example, security rule search optimization application 130 includes: a dimension analysis and selection module 132, a dimension partitioning module 134, a segment merging module 136, a policy set generation module 138, a common policy set formation module 140, and a hardware imaging module 142.

Dimension analysis and selection module 132 is configured to perform the processes discussed below in relation to dimension selection operations of FIGS. 2-4. Dimension partitioning module 134 is configured to perform partitioning operations of FIG. 2. Common policy set formation module 140 is configured to perform the processes for policy set formation. Segment merging module 136 is configured to perform the processes for segment merging. The application 130 also includes a policy set generation module 138 and hardware imaging module 142.

Figure 1D:
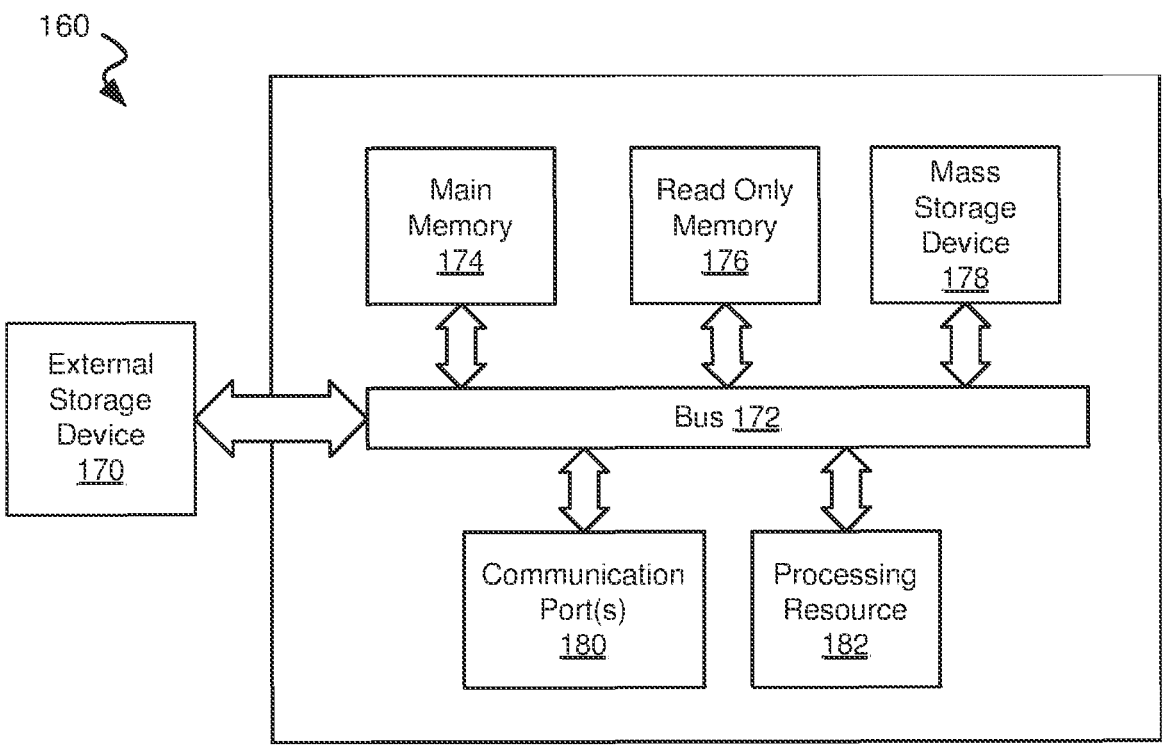

Turning to FIG. 1D, an example computer system 160 is shown in which or with which embodiments may be utilized. As shown in FIG. 1D, computer system 160 includes an external storage device 170, a bus 172, a main memory 174, a read-only memory 176, a mass storage device 178 having non-transitory computer readable medium, one or more communication ports 180, and one or more processing resources (e.g., processing circuitry 182). In one embodiment, computer system 160 may represent some portion of network element 116 and/or network security appliance 110.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc—Read Only Memory (CD-ROM), Compact Disc—Rewritable (CD-RW), Digital Video Disk—Read Only Memory (DVD-ROM). Components described above are meant only to show various possibilities. In no way should the aforementioned example computer systems limit the scope of the present disclosure.

In enterprise-level network security settings, different policy sets can have a great variety of range count and range width on given dimensions, each of which includes but are not limited to, virtual domain (VDOM), source interface (SIF), target interface (TIF), source IP address (SIP), destination IP address (DIP), protocol (PROTO), source port (SPORT), destination port (DPORT), etc. In some cases, different policies may show range diversity in different dimensions including a specific single value (both range count and range width are one), a wildcard (range count is one but range width is the full range), or a set of many range widths with a large range count.

In a set of criteria included as part of a security policy are a number of ranges for respective fields that are considered subject to the security policy. Thus, as a simple example, a security policy may apply to all source addresses between $S_0$ and $S_1$, and to all destination addresses between $D_0$ and $D_1$. Each of the criterion are dimensions. Thus, using the preceding simplified example, the range of the source addresses ($S_0$ to $S_1$) is one dimension, and the range of the destination addresses ($D_0$ and $D_1$) is another dimension. One of the dimensions for the accessed security policies is selected.

Turning to FIG. 2, a flow diagram shows a method 200 in accordance with some embodiments for improving a security policy search. The operations for the blocks of the method 200 can be performed by a processing resource of a network security appliance/device including a network gateway, a VPN appliance/gateway, or UTM appliance (e.g., the FORTIGATE family of network security appliances).

Following the flow diagram, a security policy set having security policies to be implemented for a given network are received by a tree builder module (e.g., security policy search structure building module) from a database of security policies at block 202. The security policies may include any security policies known in the art. Such security policies include a set of criteria indicating when the policy is to be applied, and one or more actions to be performed when a received packet triggers application of the security policy. Some of the security policies may be default security policies that are preloaded on a database, and others may be provided from one or more network administrators overseeing the network. Based upon the disclosure provided herein, one of ordinary skill in the art will recognize a variety of security policies and/or sources thereof that may be used in relation to different embodiments.

At block 204, the method creates a root node and attaches the policy set to it. In order for a node handling routine of the method to be called recursively, the method sets the root node as a current node at block 206. Then, the method (e.g., tree builder module) checks whether the policy set attached to the current node is sufficiently small. In one example, the method determines whether the policy set has fewer policies than a policy count threshold at block 208. If the policy set has fewer policies than the threshold, it is considered sufficiently small such that the policy set does not need to be cut into smaller policy subsets. If yes at block 208, the current node becomes a leaf node at block 210. In certain cases in another example, even though the policy set still has more policies than the threshold, the policies are indistinguishable from that node's point of view, since the node sees a smaller window on a given dimension than the root node. The policy set under this node may also be considered sufficiently small at block 208.

If the policy set attached to the current node is not below a policy count threshold, the tree builder module selects a dimension to cut the policy set into smaller policy subsets at block 212, and the number of child nodes is determined by a selected partition number at block 214. The child nodes are created accordingly and the corresponding policy subsets are attached at block 216.

The tree builder module checks whether there are any unprocessed nodes at block 218. If there is at least one more node unprocessed, this unprocessed node is assigned as a current node at block 220 and the method goes back to block 208 again. This continues until all nodes are processed or set to leaf nodes, before the tree builder finishes a workflow at block 222.

FIG. 3 illustrates a method 300 of prioritized dimension selection for a policy search tree in accordance with some embodiments for improving performance of a security policy search. The operational blocks of the method 300 can be performed by a processing resource of a network security appliance/device include a network gateway, a VPN appliance/gateway, or UTM appliance (e.g., the FORTIGATE family of network security appliances).

At block 302, the method includes differentiating dimensions (e.g., virtual domain (VDOM), source interface (SIF), target interface (TIF), source IP address (SIP), destination IP address (DIP), protocol (PROTO), source port (SPORT), destination port (DPORT)), based on multiple priority levels of a priority dimension configurable setting. Each selected dimension is subject to configurable thresholds (e.g., setting a threshold of a lower limit of a unique range count on each priority level, setting a threshold of an upper limit of a wildcard policy count on each priority level, setting a threshold of an upper limit of a layer count of repeatedly selecting a specific dimension on each priority level, etc.) for characteristics of a policy set having the security policies. In one example, a first dimension is assigned to a first priority level, a second dimension is assigned to a second priority level, and a third dimension is assigned to a third priority level based on the priority dimension configurable setting. At block 303, the method includes determining whether a prioritized dimension having a priority level (e.g., highest priority level, second highest priority level, etc.) for a node of the security policy search tree satisfies configurable thresholds for characteristics of a policy set having the security policies.

At block 306, the method includes selecting the prioritized dimension for the node of the policy search tree if no configurable threshold violation for the prioritized dimension. If the prioritized dimension does not satisfy configurable thresholds, then the method returns to block 303 to evaluate a different dimension at a same or different priority level. At block 308, the method includes setting a dimension bitmap on each priority level to activate selected dimensions on the respective priority levels.

At block 314, the method includes determining whether the prioritized dimensions do not satisfy the requirement of thresholds. If so, then at block 320, the method includes activating all dimensions only after determining that the prioritized dimensions do not satisfy the requirement of thresholds. If the prioritized dimensions do satisfy the requirement of thresholds, then the method completes at block 322.

Figure 4:
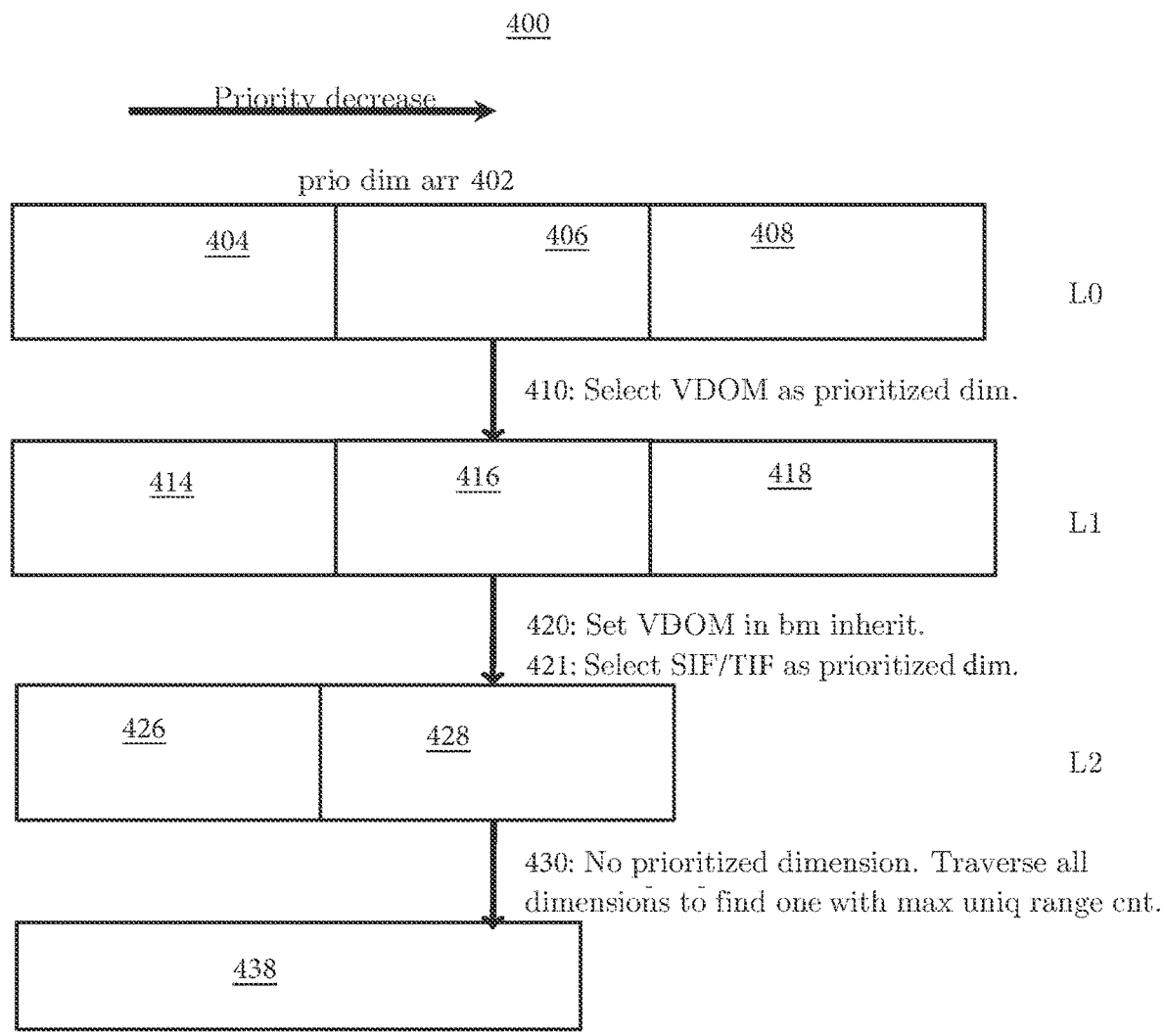
FIG. 4 illustrates an embodiment of a method of prioritized dimension selection in accordance with various embodiments.

An embodiment of a prioritized dimension selection method 400 is illustrated with FIG. 4. A configurable setting 402 (e.g., priority dimension array 402) includes a first priority level 404 with a virtual domain (VDOM) having highest priority for this example and configurable parameters (e.g., BM (dimension bitmap), TH (threshold of policy range unique count on a dimension), POL_WC_TH (policy count threshold with wildcard on a dimension), DP (depth limit)) including in one example TH: 1, POL WC TH: 65535, and DP: 2. A second priority level 406 with a source interface (SIF)/target interface (TIF) having a second highest priority includes in one example TH: 2, POL WC TH: 50, and DP: 2. A third priority level 408 for other dimensions (e.g., SIP, DIP, protocol, Source port, destination port, etc.) has no priority for layer 0. Each priority level has a group of configurable parameters, corresponding to one line of prio_dim_arr in the pseudocode of FIG. 5. For layer 0, VDOM is selected as a prioritized dimension if VDOM satisfies the configurable thresholds (e.g., TH: 1, POL WC TH: 65535, and DP: 2). VDOM is not selected as a dimension for cutting if VDOM does not satisfy the configurable thresholds.

Layer 1 includes a first priority level 414 having VDOM, TH: 1, POL WC TH: 65535, and DP: 2. A second priority level 416 with a source interface (SIF)/target interface (TIF) having a second highest priority includes in one example TH: 2, POL WC TH: 50, and DP: 2. In this example, SIF and TIF have the same priority level. A third priority level 418 for other dimensions (e.g., SIP, DIP, protocol, Source port, destination port, etc.) has no priority for layer 1.

Layer 2 includes a second priority level 426 with a source interface (SIF)/target interface (TIF) having a second highest priority including in one example TH: 2, POL WC TH: 50, and DP: 2. A third priority level 428 for other dimensions (e.g., SIP, DIP, protocol, Source port, destination port, etc.) in this example has no priority for layer 2. For layer 2, no prioritized dimension is selected. Instead, the method 400 traverses all dimensions to select a dimension with a maximum unique range count as illustrated with a priority level 438 having no priority.

Returning to FIG. 5, line 6 indicates that 8 dimensions is a maximum. Lines 10-13 list different variables (e.g., configurable thresholds). Line 15 sets VDOM as a highest level priority. Line 16 sets SIF and TIF as a second highest level priority. Other dimensions are treated as normal dimensions without special priority. The following operations for FIG. 4, as well as the pseudocode in FIG. 6, show how a prioritized dimension is selected in a single node:

a. At a node at the L0 layer, read the prio_dim_arr from higher to lower priority. Assume a given policy set has 3 distinct VDOM values, and each policy in the policy set corresponds to a single VDOM. Since 3 is larger than TH (1 in this example) and current depth for prioritized VDOM cut is 0 (i.e., the first time prioritized VDOM is taken into consideration), which is smaller than DP (2 in this example). The method in this example chooses VDOM as the dimension for tree cut on this node at operation 410, and skips all other dimensions. The parameter POL_WC_TH will be discussed later.

b. At a node at the L1 layer, assume there is only 1 VDOM in the policy set. Since 1 is not greater than TH, VDOM does not satisfy the TH threshold condition and is not selected as the prioritized dimension. As in any child node, the unique range count for VDOM only is less than or equal to the current node, thus this method at operation 420 sets the bit corresponding to VDOM in bm_inherit and skips prioritized VDOM in the future. Meanwhile, SIF or TIF is selected as the current prioritized dimension at operation 421, if TH (2 in this example) and DP (2 in this example) condition is satisfied.

c. At a node at the L2 layer, SIF/TIF has the highest priority since VDOM is skipped. Use one of them as prioritized dimension if TH and DP condition continues to hold; otherwise, the dimension with the maximum unique range count is selected, and dimensions in the priority dimension configurable setting can be ignored as prioritized dimension selection stage has ended.

d. At operation 430, as there is no valid prioritized dimension in the following tree cut, uniq_range_cnt continues to be used for dimension selection till the leaf node.

Figure 7:
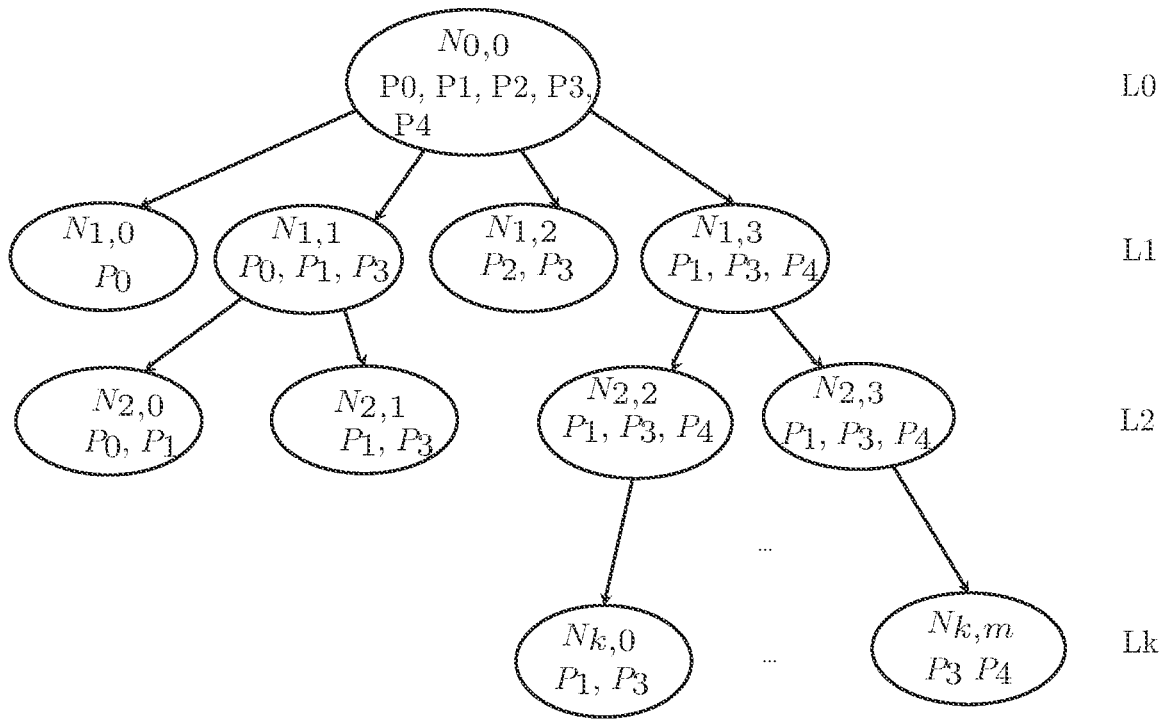
FIG. 7 illustrates a policy search tree without prioritized dimension selection.

Advantages of Using Prioritized Dimension: Lower Tree Depth and Fewer Tree Nodes An example of a policy set with no priority dimension selection is illustrated in FIG. 7. Three policies $P_0$, $P_1$, and $P_2$ each have a unique VDOM, while policies $P_3$ and $P_4$ share the same VDOM. Other dimensions (e.g., SIP, DIP, SIF, TIF, etc.) of all policies have a near random distribution with certain range overlap. If the tree build process does not engage prioritized dimension selection, the tree build process traverses all dimensions before selecting one with the maximum unique range count. In this example, the tree build process selects SIP and then can split the current node to 4 child nodes ($N_{1,0}$-$N_{1,3}$). Afterwards, for each child node, the dimensions are traversed again in a similar way, recursively. In layer k ($L_k$) of the whole tree, the tree build process finishes by limiting a number of policies in each leaf node up to 2.

Figure 8:
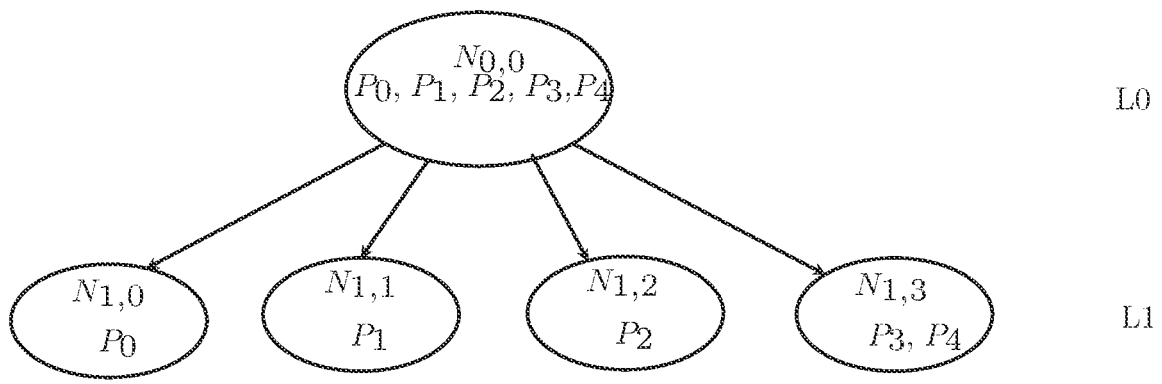
FIG. 8 illustrates a policy search tree with prioritized dimension selection in accordance with various embodiments.

On the other hand, by selecting a highest priority dimension first (e.g., VDOM), regardless of other dimension's unique range count, as shown in FIG. 8, the policy search tree has all leaf nodes in L1. In a scenario with more policies, some leaf nodes can exist in a deeper layer, but the overall tree depth is smaller than that without a prioritized VDOM. Therefore, prioritized dimension selection can efficiently lower tree depth and reduce the number of tree nodes and this results in shorter policy searches.

Scalability and Configurability of Parameters

By setting different parameter values in the priority dimension configurable setting, including multiple bitmaps and corresponding thresholds, a policy search tree becomes more configurable based on policy features. According to one embodiment, in FIG. 5, multiple dimensions such as SIF/TIF can have a same priority level in a bitmap. If dimension IDs (dim) on source interface and target interface are SIF=0 and TIF=1, at this priority level, bitmap BM= (1<<SIF)|(1<<TIF)=0x3.

In addition, there are three other thresholds to affect the prioritized dimension selection:
  a. TH is the lower limit of the unique range count of the dimension(s) at a given priority level. Only when a unique range count for a dimension is greater than TH, this dimension is eligible for being selected. The heuristics for this threshold are cutting on a dimension only when the distinct ranges deserve the tradeoff that skips other dimensions in an early stage of the tree build.
  b. POL_WC_TH is the upper limit of the wildcard policy number threshold of the dimension(s) at a given priority level. Only when the number of policies with a wildcard on a dimension is less than POL_WC_TH, this dimension is eligible for being selected. The heuristics for this threshold are that cutting on a dimension where policies have many wildcards may not separate policies into child nodes effectively. Therefore, cutting on other dimensions can be a better choice if the dimension(s) at a priority level is overcrowded with wildcards.
  c. DP is the upper limit of the layer count of repeatedly selecting a specific dimension. The heuristics for this threshold are when multiple cuts have been applied to that dimension, continue to cut on the same dimension for a deeper layer may lead to over cutting.

Inheritance of Bitmap for Further Optimization

Figure 9:
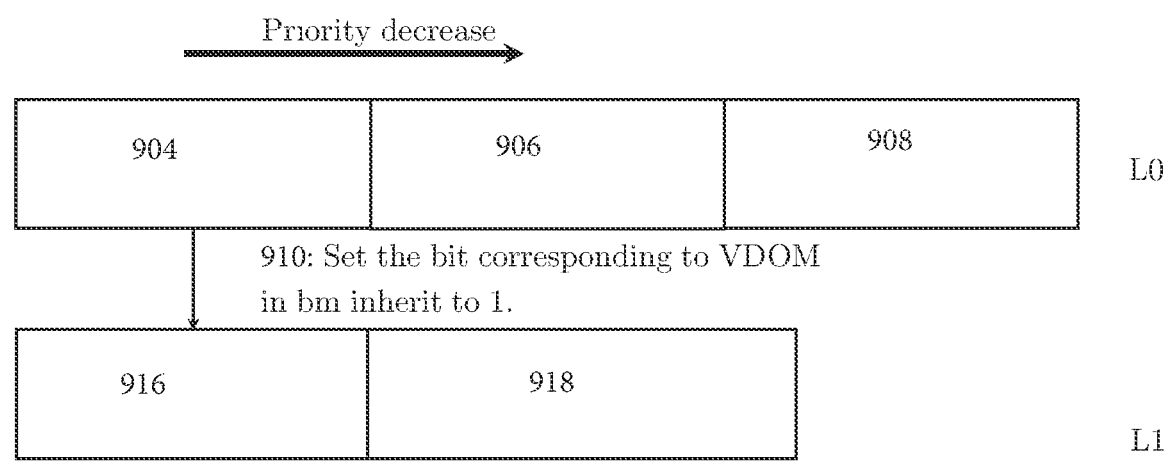
FIG. 9 illustrates a prioritized dimension inherited bitmap example in accordance with various embodiments.

FIG. 9 illustrates an example of inheritance in priority dimension selection in accordance with one embodiment. In the root node (L0), set VDOM and SIF/TIF into a priority dimension configurable setting (e.g., prio_dim_arr). VDOM has the highest priority in a first priority level 904 and SIF/TIF has the second highest priority in a second priority level 906. A third priority level 908 for other dimensions (e.g., SIP, DIP, protocol, Source port, destination port, etc.) has no priority for L0. When the priority dimension configurable setting is inspected in this node, if VDOM is excluded from the prioritized dimension selection in current node due to a threshold violation, as unique range count on a dimension in a child node is never larger than that of the parent node, VDOM can also be skipped in the child node. This skipping information is carried by bitmap bm_inherit in the pseudocode of FIG. 6 and shown as operation 910 in FIG. 9. Equivalently, in the layered diagram in FIG. 9, VDOM is removed from the left most box of L1. SIF/TIF has priority in a second priority level 916 of L1. A third priority level 918 for other dimensions (e.g., SIP, DIP, protocol, Source port, destination port, etc.) has no priority for L1. The priority dimension configurable setting (e.g., prio_dim_arr) is applied to all child nodes in the same layer.

This present design proposes an optimization of a policy search tree. It overcomes the aforementioned technical challenges by introducing the prioritized dimension selection, when there are multiple ranges and values in different dimensions in a large policy set. Instead of traversing all dimensions in every tree node and selecting a dimension with the maximum unique range count, the prioritized dimension selection can select an optimal dimension in a shorter time. The prioritized dimension selection optimizes policy search tree with lower depths, fewer tree nodes and reduced tree build time. With characteristics of scalability and inheritance, the policy search tree can be further optimized.

In conclusion, the present design provides for novel systems, devices, and methods. While detailed descriptions of one or more embodiments of the present design have been given above, various alternatives, modifications, and equivalents will be apparent to those skilled in the art without varying from the spirit of the present design. Therefore, the above description should not be taken as limiting the scope of the present design, which is defined by the appended claims.

What is claimed is:

1. A computer-implemented method for optimizing a security policy search tree, the computer-implemented method comprising:
   differentiating, with a network appliance, dimensions based on multiple priority levels of a priority dimension configurable setting;
   determining whether a first dimension having a first priority level for a node of the security policy search tree satisfies configurable thresholds for characteristics of a policy set; and
   selecting the first dimension having the first priority level if no configurable threshold violation for the first dimension.

2. The computer-implemented method of claim 1, further comprises:
   setting a dimension bitmap on each priority level to activate selected dimensions on the priority levels.

3. The computer-implemented method of claim 1, further comprises:
   setting a threshold of a lower limit of a unique range count on each priority level;
   setting a threshold of an upper limit of a wildcard policy count on each priority level; and
   setting a threshold of an upper limit of a layer count of the security policy search tree for repeatedly selecting a specific dimension on each priority level.

4. The computer-implemented method of claim 1, wherein the first dimension is assignable for the first priority level, a second dimension is assignable for a second priority level, and a third dimension is assignable for a third priority level having no priority based on the priority dimension configurable setting.

5. The computer-implemented method of claim 1, further comprises:
   determining whether a second dimension having a second priority level for the node of the security policy search tree satisfies configurable thresholds for characteristics of the policy set; and
   selecting the second dimension having the second priority level if no configurable threshold violation for the second dimension.

6. The computer-implemented method of claim 1, further comprises:
activating all dimensions for the node after the first dimension having a first priority level and a second dimension having a second priority level do not satisfy the configurable thresholds.

7. The computer-implemented method of claim 1, wherein the dimensions comprise a virtual domain (VDOM), a source interface (SIF), a target interface (TIF), a source internet protocol (IP) address, a destination IP address, a protocol, a source port, or a destination port, wherein security policies are multi-dimensional and have a variety of range count and range width on given dimensions.

8. The computer-implemented method of claim 1, further comprising:
using bitmap inheritance to accelerate a tree build process of the security policy search tree.

9. The computer-implemented method of claim 1, wherein the network appliance comprises a network security appliance or a network gateway server.

10. A system comprising:
a processing resource; and
a non-transitory computer readable medium coupled to the processing resource and having stored therein instructions being executable by the processing resource cause the processing resource to:
differentiate dimensions for a node of a policy search tree based on multiple priority levels of a priority dimension configurable setting;
determine whether a first dimension having a first priority level for the node of the policy search tree satisfies configurable thresholds for characteristics of a policy set having security policies; and
select the first dimension having the first priority level if no configurable threshold violation for the first dimension.

11. The system of claim 10, wherein the instructions being executable by the processing resource to:
set a dimension bitmap on each priority level to activate selected dimensions on the priority levels.

12. The system of claim 10, wherein the instructions being executable by the processing resource cause the processing resource to:
set a threshold of a lower limit of a unique range count on each priority level;
set a threshold of an upper limit of a wildcard policy count on each priority level; and
set a threshold of an upper limit of a layer count of the policy search tree for repeatedly selecting a specific dimension on each priority level.

13. The system of claim 10, wherein the first dimension is assignable for the first priority level, a second dimension is assignable for a second priority level, and a third dimension is assignable for a third priority level having no priority based on the priority dimension configurable setting.

14. The system of claim 10, wherein the instructions being executable by the processing resource cause the processing resource to:
determine whether a second dimension having a second priority level for the node of the policy search tree satisfies configurable thresholds for characteristics of a policy set having the security policies; and
select the second dimension having the first priority level if no configurable threshold violation for the first dimension.

15. The system of claim 10, wherein the instructions being executable by the processing resource cause the processing resource to:
activate all dimensions for the node after the first dimension having a first priority level and a second dimension having a second priority level do not satisfy the configurable thresholds.

16. The system of claim 10, wherein the dimensions comprise a virtual domain (VDOM), a source interface (SIF), a target interface (TIF), a source internet protocol (IP) address, a destination IP address, a protocol, a source port, or a destination port, wherein the security policies are multi-dimensional and have a variety of range count and range width on given dimensions, wherein the system comprises a network security appliance or a network gateway server.

17. The system of claim 10, wherein the instructions being executable by the processing resource cause the processing resource to:
use bitmap inheritance for the first dimension to accelerate a tree build process of the policy search tree.

18. A non-transitory computer readable medium having stored therein instructions being executable by a processing resource cause the processing resource to:
differentiate dimensions for a node of a policy search tree based on multiple priority levels of a priority dimension configurable setting;
determine whether a first dimension having a first priority level for the node of the policy search tree satisfies configurable thresholds for characteristics of a policy set having security policies; and
select the first dimension having the first priority level if no configurable threshold violation for the first dimension.

19. The non-transitory computer readable medium of claim 18, wherein the instructions being executable by the processing resource cause the processing resource to:
set a dimension bitmap on each priority level to activate selected dimensions on the respective priority levels.

20. The non-transitory computer readable medium of claim 18, wherein the instructions being executable by the processing resource cause the processing resource to:
set a threshold of a lower limit of a unique range count on each priority level;
set a threshold of an upper limit of a wildcard policy count on each priority level; and
set a threshold of an upper limit of a layer count of the policy search tree for repeatedly selecting a specific dimension on each priority level.

* * * * *